Sept. 25, 1956  A. H. MESSLER ET AL  2,764,170
DISH WASHING AND DRYING APPARATUS
Filed Oct. 25, 1950  3 Sheets-Sheet 1

Inventors
Allan H. Messler
Harold D. Gaudet
By
Attorney

Sept. 25, 1956 A. H. MESSLER ET AL 2,764,170
DISH WASHING AND DRYING APPARATUS
Filed Oct. 25, 1950 3 Sheets-Sheet 2

Inventors
Allan H. Messler
Harold D. Gaudet
By
Attorney

United States Patent Office 2,764,170
Patented Sept. 25, 1956

2,764,170

DISH WASHING AND DRYING APPARATUS

Allan H. Messier, West Hartford, and Harold D. Gaudet, Clinton, Conn., assignors, by mesne assignments, to Vulcan-Hart Manufacturing Company, Inc., Louisville, Ky., a corporation of Kentucky Application October 25, 1950, Serial No. 192,006

24 Claims. (Cl. 134—46)

The invention relates to a combined washing and drying apparatus for dishes, the apparatus comprising two sections or units arranged in tandem so that dishes may move from one to the other.

There are two dish carrying conveyors, one for the washing section or unit and the other for the drying section or unit. Each conveyor is individually driven by a clutch, and one of the objects of the invention is to provide manually operable means for simultaneously engaging both clutches to start both conveyors and for simultaneously disengaging both clutches to stop both conveyors.

A transfer means is provided for transferring dishes from the washing conveyor to the drying conveyor and a slide is provided for transferring dishes from the drying conveyor to a suitable receiving table. The said slide is movable, and if an article is caught between the conveyor and the slide the said slide is moved by the said article. Another object of the invention is to provide means for disengaging both clutches to stop both conveyors when the slide is so moved.

The transfer means between the two conveyors may also be a movable slide, and a further object of the invention is to provide means operable upon the movement of either slide to disengage both clutches to stop both conveyors.

Other objects of the invention will be apparent from the drawings and from the following specifications and claims.

The drawings show a presently preferred embodiment of the invention, but it will be understood that various changes may be made from the construction shown and that the drawings are not to be construed as defining or limiting the scope of the invention, the claims hereof being relied upon for that purpose.

An apparatus embodying the invention includes a washing section and a drying section arranged in tandem so that dishes move from the washing section to the drying section. While the invention is not so limited, the washing section and the drying section may conveniently constitute two more or less separate units 10 and 12. These units are mounted in end to end relationship so that the dishes after being washed in the washing unit are transferred to the drying unit for drying. The two units are connected with each other, at least to the extent hereinafter described in detail. They may be additionally connected, if found desirable.

Figures 1, 2:
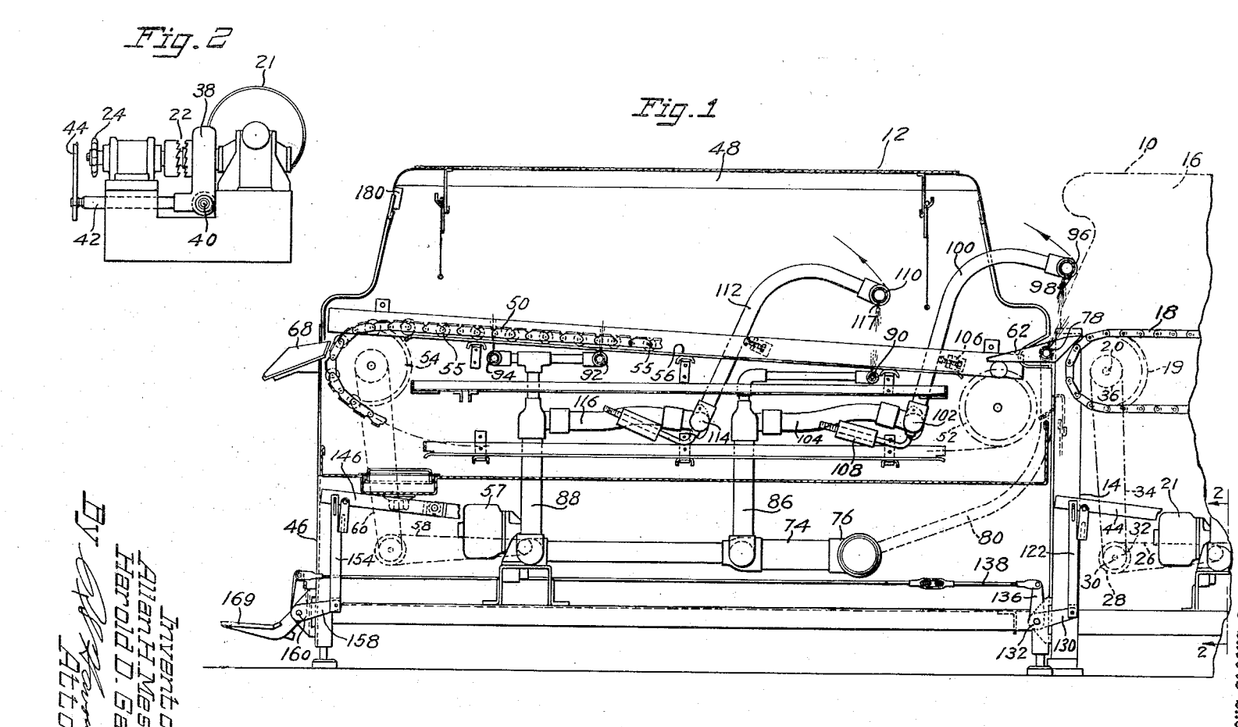
Fig. 1 is a fragmentary longitudinal sectional view, partly diagrammatic, of a dish washing and drying apparatus embodying the invention, this view omitting certain parts which are fully shown in Figs. 3 and 5.
Fig. 2 is an enlarged fragmentary view, partly diagrammatic, taken along the line 2—2 of Fig. 1.

Only a portion of the washing unit is shown and, except as hereinafter described in detail, the said unit may conveniently be of the general type shown and described in Patent No. 1,719,410 in the name of George Webb, dated July 2, 1929. The washing unit comprises a main frame indicated generally at 14 and a housing 16 supported by the main frame, the housing being open at its opposite ends for entry of the dishes to be washed and for the discharge thereof after washing. Mounted on the main frame and within the housing 16 is an endless belt conveyor 18 which is adapted to support the dishes and to move them from the rear of the machine to the front thereof, that is, from right to left as shown in the drawing. At the front of the machine the conveyor belt passes around a supporting and driving drum 19 on a transverse shaft 20. The conveyor 18 is relatively wide and extends transversely through the major portion of the distance between the side walls of the housing 16. The dishes are ordinarily supported directly on the conveyor 18, but they may be supported in suitable racks or carriers, which racks or carriers are supported on the conveyor 18. Suitable washing and rinsing devices, not shown, are provided above and below the path of dish movement, these devices serving to deliver jets or sprays of washing and rinsing water upward and downward against the dishes. The conveyor 18 is foraminous so that the lower washing and rinsing jets or sprays may move upward through the conveyor to engage the dishes and so that the liquid from the upper jets or sprays may drain downward through the conveyor.

As shown, the conveyor 18 is driven by an electric motor 21, this motor being connected by a suitable reduction gearing with the driving element of a toothed clutch 22 as shown in Fig. 2. Connected with the driven element of the said clutch is a sprocket wheel 24. An endless drive chain 26 engages the sprocket wheel 24 and also a sprocket wheel 28 mounted on a transverse shaft 30. Also mounted on the shaft 30 is a sprocket wheel 32. A chain 34 engages the sprocket wheel 32 and also a sprocket wheel 36 connected with the shaft 20 which carries the drum 19. It will be seen that when the clutch 22 is engaged power is transmitted from the motor 21 to drive the conveyor 18. The driving element of the clutch 22 is movable endwise into or out of engagement with the driven element thereof, such movement being effected by means of a yoke 38 pivoted at 40 and connected with an arm 42. The arm 42 is operably connected with a lever 44 which may be moved to engage or disengage the clutch 22 in the manner hereinafter described in detail.

The drying unit 12 comprises a main frame indicated generally at 46 and a housing 48 supported by the main frame, the housing being open at its opposite ends for the entry of dishes from the washing unit and for the discharge of dishes after drying. Mounted on the frame 46 and within the housing 48 is an endless belt conveyor 50, this conveyor being supported and guided at its ends by rotatable drums 52 and 54. The conveyor is adapted to support the dishes and to move them from the washing unit to the discharge opening at the front, that is, from right to left as shown in the drawing. The conveyor 50 is relatively wide and extends transversely through the major portion of the distance between the side walls of the housing 48, the upper run of the conveyor thus providing a flat surface on which the dishes are supported. As shown, the drum 54 is at a somewhat higher elevation than the drum 52, the upper surface of the conveyor being therefore inclined upward and forward. The conveyor 50 is foraminous and it preferably comprises a multiplicity of interconnected links which are transversely spaced so as to provide openings between them. The conveyor 50 may have rollers 55, 55 at its edges, these rollers traveling on tracks 56 so that the upper run of the conveyor is firmly supported.

The conveyor 50 is driven by an electric motor 57 which may be similar to the motor 21. The connections between the motor 57 and the conveyor 50 may be the same as or similar to the connections already described between the motor 21 and the conveyor 18. Repetition of the description is unnecessary, but it will be observed that the connection includes chains 58 and 60 similar respectively to the chains 26 and 34.

A means is provided for receiving dishes from the conveyor 18 of the dish washing unit and for transferring them onto the conveyor 50 of the dish drying unit. As shown, the tranferring means is a slide 62, and when the receiving end of the conveyor 50 is lower than the discharge end of the conveyor 18 the slide 62 has an inclined upper face. The dishes ordinarily slide by gravity along the slide 62, but if any dish does not so slide it is pushed by the next following dish from the conveyor. When the slide 62 is inclined as shown, it is preferably movable to a limited extent in the direction of dish movement, this being clearly shown in Fig. 3 and being hereinafter described in detail. As shown, the slide 62 is carried by arms 64 at opposite sides of the machine, these arms being pivotally connected with the frame 14 for movement about a transverse axis at 65. A spring 66 normally holds the slide in its rearmost position as shown in Fig. 2. Preferably, upright guards 67, 67 are provided at the sides of the slide 62, these guards serving to guide dishes along the slide and also serving to retain any liquid that may be splashed transversely from the dishes.

Figure 5:
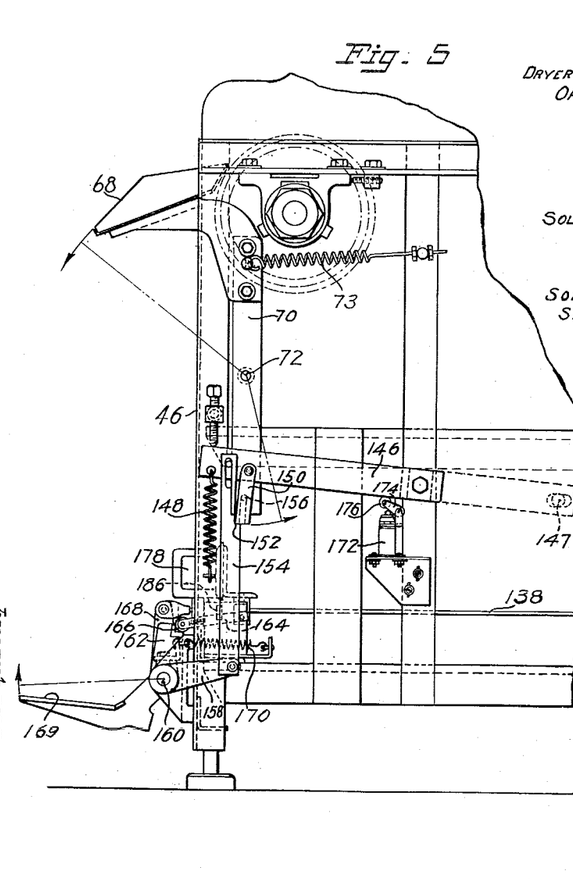
Fig. 5 is an enlarged fragmentary side view of certain parts at the front or discharge end of the drying unit of the apparatus.

A transfer slide 68 is provided for receiving dishes from the front or discharge end of the conveyor 50 and for transferring them to a suitable table which is not shown. As clearly shown in Fig. 5 and as hereinafter described in detail, the slide 68 is also movable to a limited extent in the direction of dish movement. As shown, the slide 68 is carried by arms 70 at opposite sides of the machine, these arms being pivotally connected with the frame 46 for movement about a transverse axis at 72. A spring 73 normally holds the slide in its rearmost position as shown in Fig. 5.

After the dishes have been washed in the washing unit and after they have left the washing unit conveyor 18, they are subjected to upward and downward moving jets of air. The air jets serve to blow any retained water from the faces of the dishes and also serve to dry the dishes. The arrangements of the air jets may be widely varied and the means for delivering the air jets may also be widely varied. One suitable air jet construction is shown in the drawing, this having certain particularly advantageous features which will be pointed out.

Carried by the frame 46 is a longitudinal duct 74 which receives air under pressure through a connection at 76. The means for supplying the air constitutes no part of the present invention and is not shown. The several manifolds for delivering jets of air against the dishes are connected with the duct 74 to receive air therefrom.

A transverse manifold 78 is preferably provided for delivering jets of air upward against the dishes after washing, this manifold being closely associated with the transfer means between the two conveyors. When the transfer means is a movable slide such as 62, the manifold is movable with the slide. Air is supplied to the manifold 78 by means of a flexible pipe or hose 80 which is connected with the duct 74, the hose 80 permitting the manifold 78 to move with the slide 62. The slide 62 comprises a plurality of transversely spaced longitudinal bars 82, 82 which are apertured to receive the transverse manifold 78. The jet apertures 84, 84 in the manifold 78 are so spaced that they are between the bars 82, 82, and the apertures are preferably so positioned that the jets therefrom are delivered along lines that are inclined toward the rear.

Connected with the duct 74 are two upright pipes 86 and 88. The pipe 86 is connected with a manifold 90 which is immediately below the upper run of the conveyor 50. This manifold extends transversely and has a plurality of upward directed apertures therein, these apertures serving to deliver jets of air which pass through the conveyor 50 and engage the dishes. The pipe 88 is connected with similar manifolds 92 and 94 which also have upward directed jet apertures therein.

One or more transverse upper manifolds are provided for delivering jets of air downward against the dishes after they have been washed. One of these manifolds is shown at 96, this manifold having apertures for delivering jets of air downward. The manifold 96 is positioned above the slide 62 of the washing unit, and is preferably spaced slightly rearward from the manifold 78. The jet apertures 98 in the manifold 96 are preferably positioned to deliver jets of air along lines that are inclined toward the front. The manifold 96 is relatively close to the path of dish movement over the slide 62 but is nevertheless at a sufficient elevation to ordinarily permit dishes to clear it as they are moved. In order that unusually large dishes, or a rack of dishes, may pass under the manifold, it is preferably carried by a supporting member in the form of a pipe 100 which is pivoted for movement about a transverse axis at 102. The pipe 100 communicates with the manifold 96 and is connected with a pipe 104 which communicates with the pipe 86. The two pipes 100 and 104 are so connected that the pipe 100 with the manifold 96 can freely move pivotally as stated. It will be observed that the pivotal axis at 102 is below the path of dish movement and is spaced forward from the manifold 96. Thus when the manifold 96 is engaged by a dish or dish rack it is moved upward and forward from its normal position to permit the dish or rack to pass beneath it. It thereafter returns by gravity to the position shown. An adjustable stop 106 limits downward and rearward movement of the supporting member 100 and of the manifold 96. Preferably, in order that the supporting member and manifold may be more readily moved, an adjustable counterweight 108 is provided.

A second upper manifold 110 is provided which is similar to the manifold 96, being similarly carried by a supporting member or pipe 112 pivoted at 114 and connected by a pipe 116 with the pipe 88. The manifold 110 is spaced forward from the manifold 96 and is above the path of the dishes on the conveyor 50. It is similarly movable forward and upward when engaged by a large dish or by a dish rack. The jet apertures 117 in the manifold 110 are similarly positioned to deliver jets of air along lines that are inclined toward the front.

It will be seen that the air jets from the manifolds 96 and 78 engage the dishes as they move along the transfer means between the two conveyors, this transfer means as shown being the slide 62. The dishes are ordinarily placed on the conveyor 18 with their top faces downward so that they will hold minimum quantities of water from the washing operations, but they may be sometimes placed on the conveyor with their top faces upward, the dishes then holding relatively large quantities of water. The function of the jets from the manifolds 96 and 78 is to remove water from the dishes by the force of air movement. As each dish moves over the slide its upper face encounters a wall of downward moving air from the manifold 96 and its lower face encounters a wall of upward moving air from the manifold 78. These walls of downward and upward moving air serve to prevent any substantial amounts of water from passing through them. The major portion of the water is thus wiped from the faces of the dishes before they enter the drying unit.

Obviously, the only water on the lower faces of the dishes is that retained by surface adhesion. Much larger quantities of water may be held by the upper faces of the dishes. It has been found by tests and by experience that the water held by the upper faces of the dishes is more effectively wiped or blown off when the jets from the manifold 96 are inclined forward as shown. With the jets thus inclined, the major portion of the water is not only removed, but the major portion thereof is driven rearward with considerable force into the washing unit. The guards 67, 67 prevent any splash from moving laterally beyond the sides of the apparatus.

The action of the air jets from the manifolds 110 and 90 is substantially the same as that of the air jets from the manifolds 96 and 78. These second jets serve to wipe off any quantities of water that may have escaped the action of the first jets. The air jets from the final manifolds 92 and 94 serve to maintain a circulation of air and to complete the drying action in the forward portion of the housing 48. When the dishes reach the end of the conveyor 50 and pass onto the transfer slide 68 they are completely dried.

When the transfer means between the two conveyors is a movable slide such as 62, a small article may be caught between the conveyor 18 and the said slide during the operation of the washing unit. Such an article may be a broken dish or a piece of silverware or a bone or other scrap material which has not been properly removed from the dishes before washing. In the event that any article is caught as above-mentioned, the slide 62 moves in the direction of conveyor movement and mechanism is provided which enables the slide upon being moved as stated to disconnect the drive mechanism for the conveyor so that the conveyor quickly stops. By thus quickly stopping the conveyor any damage to the machine is prevented.

Figure 3:
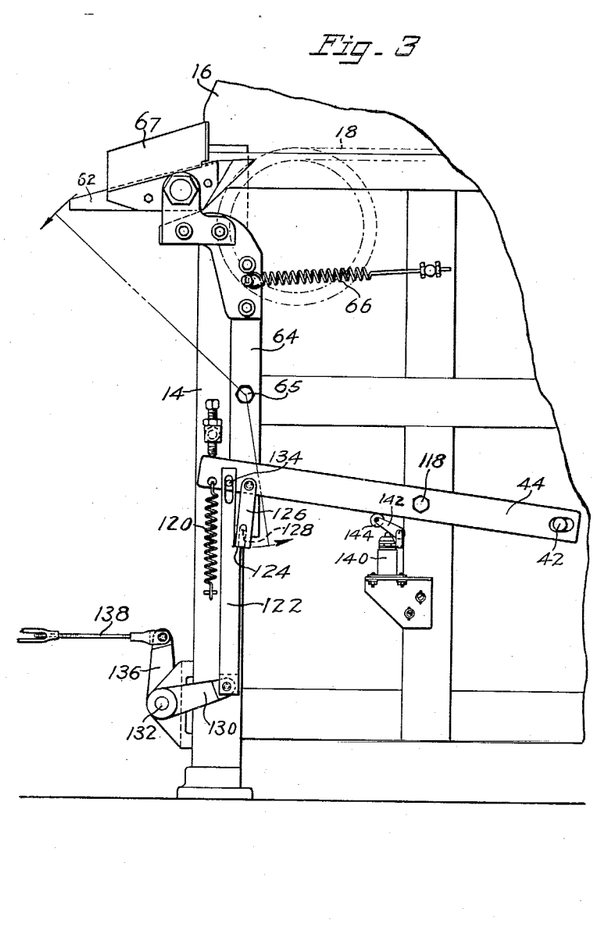
Fig. 3 is an enlarged fragmentary side view of certain parts at the front or discharge end of the dish washing unit of the apparatus.
Figure 4:
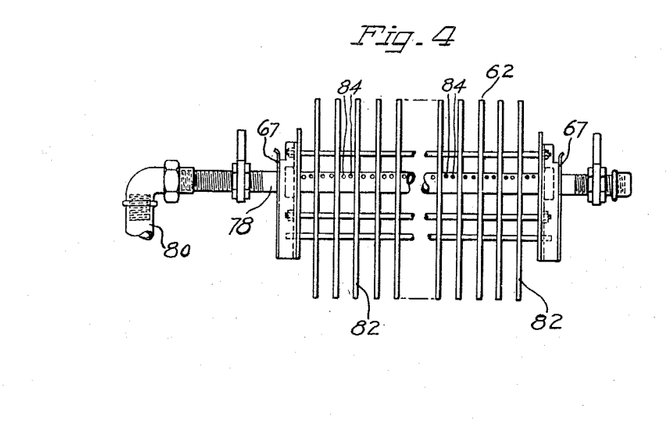
Fig. 4 is a fragmentary plan view on the same scale as Fig. 3 showing the dish transfer slide of the washing unit and certain parts associated therewith.

The mechanism which enables the movement of the slide 62 to effect the stopping of the conveyor is shown in part in Fig. 3 and in part in Fig. 2. Mention has already been made of the lever 44 which serves to operate the clutch 22. This lever is pivoted to the main frame 14 at 118 and spring 120 serves to bias the lever for movement in the counterclockwise direction, that is, in the direction for disengaging the elements of the clutch 22. Associated with the lever 44 is a vertical member 122 having a notch 124 therein. Pivotally connected with the lever 44 is a latch 126 which is normally entered in the notch 124. As has been stated, the slide 62 is carried by two arms 64, one of which is shown in Fig. 3, these arms being pivotally movable about a transverse axis at 65. At the lower end of the arm 64, as shown in Fig. 3, is a pin 128 which enters a longitudinal slot in the latch 126, the pin normally holding the latch in the notch. When the member 122 is in the position shown and when the latch 126 is engaged with the notch 124, the lever 44 is held in the position shown and the parts of the clutch 22 are engaged. When the slide 62 is moved in the forward direction, that is, toward the left as viewed in Fig. 3, the pin 128 moves the latch 126 out of the notch 124, the lever 44 being then free to move in the counterclockwise direction under the action of the spring 120. Such movement of the lever 44 serves to disengage the parts of the clutch 22, thus stopping the motion of the conveyor 18.

The before-mentioned member 122 is vertically movable and it is pivotally connected at its lower end with an arm 130 secured to a rockshaft 132. The upper end of the member 122 is guided by a pin 134 which enters a vertical slot in the member. Also secured to the rockshaft 132 is an arm 136 connected with a tension link 138. When the link 138 is under tension the arms 136 and 130 are held in the positions shown and the member 122 is also held in the position shown. After the latch 126 has been moved from the notch 124 and after the lever 44 has been moved as described to disengage the clutch, reengagement of the lever with the notch may be effected by releasing the tension in the link 138 thus permitting the member 122 to move downward. When the latch has reentered the notch, the link 138 can be moved to raise the member 122 to the position shown. Thus the clutch 22 is reengaged and the movement of the conveyor 18 is resumed.

It will be seen that if the tension in the link 138 is released with the latch engaged with the notch, the member 122 and the latch 126 will move downward in unison, thus disengaging the clutch 22 in the manner already described.

Preferably a normally open switch 140 is suitably mounted on the frame 14, this switch having an operating button at the top. Associated with the switch 140 is a pivoted lever 142 having a roller 144 which engages the lower side of the lever 44. When the lever 44 is moved in the counterclockwise direction to disengage the elements of the clutch 22, the lever 142 is moved to engage the button of the switch 140 so as to close the electrical connection through the switch.

Associated with the slide 68 is a mechanism for stopping the conveyor 50 in the event that any article is caught between the said slide 68 and the conveyor 50. This mechanism is or may be similar to the mechanism associated with the slide 62. A pivoted lever 146 is provided which corresponds to the lever 44, this lever being biased by a spring 148. The lever 146 engages a lever 147 similar to the lever 42 and serves to effect the engagement and disengagement of the clutch for driving the conveyor 50, the action being the same as that already described in connection with the lever 44. The lever 146 carries a pivoted latch 150 which is normally entered in a notch 152 in a vertically movable member 154. A pin 156 on the arm 70 which carries the slide 68 engages the latch 150 to move it when the slide is moved, thus releasing the lever 146 and causing the disengagement of the clutch which drives the conveyor 50.

The member 154 is pivotally connected at its lower end with an arm 158 on a transverse rockshaft 160. The rockshaft 160 carries an upward extending arm 162 having a notch therein which is normally engaged by a latch for holding it in the position shown and for thus holding the member 154 in its uppermost position. As shown, the latch comprises a lever 164 carrying a roller 166 which is normally entered in a notch in the arm 162. When the lever 164 is swung upward the roller 166 is withdrawn from the notch and the arm 162 is free to move in the clockwise direction under the influence of the spring 148, the member 154 and the latch 150 then moving downward in unison so as to swing the lever 146 in the counterclockwise direction and thus disengage the clutch for the conveyor 50.

The rockshaft 160 also carries an arm 168 which is pivotally connected with the forward end of the before-mentioned link 138. When the latch is engaged with the arm 162 the said latch serves not only to hold the member 154 in its uppermost position but, through the action of the link 138 and its associated parts, serves also to hold the member 122 in its uppermost position. Thus the latch 164, 166 holds both clutches in engagement so as to operate both conveyors. When the latch is withdrawn from the arm 162 both of the members 154 and 122 are free to move downward to cause disengagement of both clutches and stop both conveyors.

Figure 6:
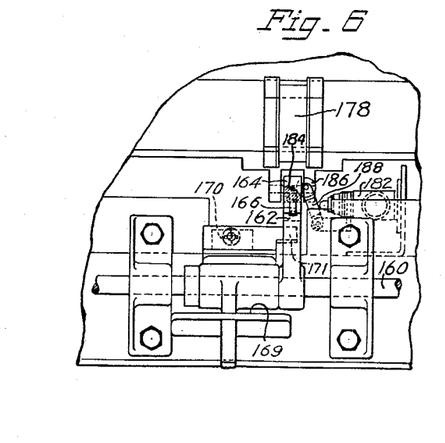
Fig. 6 is a fragmentary front view of some of the parts shown in Fig. 5.

Also carried by the rockshaft 160 is a foot treadle 169 which serves to rock the shaft 160 in the counterclockwise direction. Preferably the treadle 169 is rotatable with respect to the shaft 160 within narrow limits. A spring 170 serves to bias the treadle for movement in the clockwise direction, the treadle being normally in its upper position as shown. In order that the treadle may move the rockshaft, it is provided with a transverse projection 171, as shown in Fig. 6, which is behind the arm 162. When the treadle is moved downward, the spring 170 is first tensioned and then the projection 171 engages the arm 162 to move the said arm and also the shaft 160. When the latch 164, 166 has been withdrawn from engagement with the arm 162 and when the members 154 and 122 have been moved downward to disengage the clutches, the treadle 169 may be pressed to act as above stated to move the rockshaft 160 and also the rockshaft 132 in the counterclockwise direction thus raising both members 154 and 122 to re-engage both clutches and start both conveyors.

When the treadle is pressed as aforesaid, the latch 164, 166 re-engages the arm 162 to hold it in its forward position, and when the treadle is released it is restored to its upper position by the spring 170. The described lost motion between the treadle 169 and the shaft 160 enables the shaft and the parts connected therewith to move more freely when released by the latch. The treadle is normally held in its upper position by the spring and the weight of the treadle does not restrict the movement of the shaft and its associated parts. If the treadle were not normally held in its upper position as described, the treadle would be objectionably snapped upward whenever the arms 162 and 168 are moved in the clockwise direction to release one or both of the clutches.

Suitably mounted on the frame 46 is a switch 172 which is normally open, this switch being similar to the switch 140 and having an operating button at the top. Associated with the switch 172 is a pivoted lever 174 having a roller 176 which engages the lower side of the lever 146. When the lever 146 is moved in the counterclockwise direction to disengage the corresponding clutch, the lever 174 is moved to engage the button of the switch 172 so as to close the electrical connection through the switch.

The before-mentioned latch comprising the lever 164 and the roller 166 is manually operable for disengagement and preferably it is so operated by means of a solenoid 178 controlled by a manually operable switch. The lower end of the core of the solenoid is connected with the lever 164. When the solenoid is not energized the core is in its lowermost position as shown in Fig. 5 and the latch is engaged. However, when the solenoid is energized the core thereof is raised, thus raising the lever 164 and moving the roller 166 upward. As soon as the roller 166 moves out of the notch in the arm 162, the said arm moves in the clockwise direction and the various parts connected therewith are correspondingly moved in the manner already described to disengage both clutches and stop both conveyors. When the solenoid is de-energized the roller 166 rests on the top of the arm 162.

Suitably mounted on the apparatus, preferably near the forward end of the drying unit, is a push button stop switch 180 which is normally open, but which can be manually closed to complete the circuit through the solenoid. When the switch 180 is closed, the solenoid is energized and the latch is withdrawn as already described, thus disengaging both clutches and stopping both conveyors.

Figure 7:
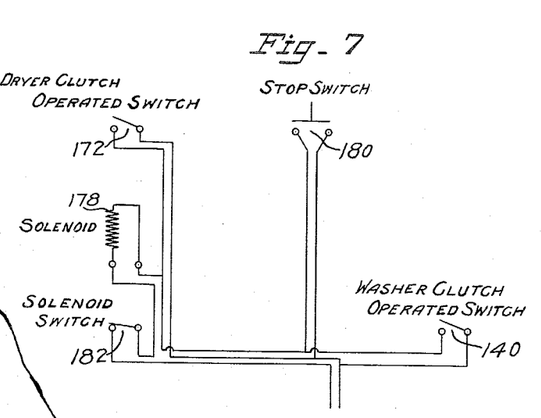
Fig. 7 is a diagram of electrical connections.

As will be more apparent from the diagram of electrical connections appearing in Fig. 7, the before-mentioned switch 172 is connected in parallel with the switch 180. The switch 140, when provided, is also in parallel with the switch 180. Thus when any one of the switches 180 or 172 or 140 is closed, the solenoid is energized to withdraw the latch 164, 166 from engagement with the arm 162 so as to disengage both clutches and stop both conveyors.

A switch 182 is provided in series with the solenoid, this switch being normally closed as shown in Fig. 7. The lever 164 is provided with a cam face 184 as shown in Fig. 6, which cam face is normally engaged by a roller 186 on a pivoted lever 188. When the lever 164 is in its lower position, as shown in Fig. 5, the roller 186 is in the position shown in Fig. 6. However, when the lever 164 is moved upward, the roller 186 and the lever 188 are moved in the clockwise direction, the lever 188 engaging the button of the switch 182 to open the said switch. With the switch 182 open, the solenoid is de-energized and the latch 164, 166 is free to move downward so that the roller 166 rests on the top of the arm 162. As soon as the arm 162 has been moved sufficiently forward, the roller 166 enters the notch in the arm to hold the arm in its forward position.

After the latch has been moved upward to cause the disengagement of the clutches and the stopping of the conveyors, the said clutches may be re-engaged and the conveyors may be started by pressing downward on the foot treadle 169. As the treadle moves downward the members 154 and 122 are moved upward to cause re-engagement of the clutches and the arm 162 is moved forward to permit the latch to engage therewith. Inasmuch as the switch 182 is open, the solenoid is de-energized and the latch will move freely downward. Without the switch 182 the solenoid would be energized by one or both of the switches 172 and 140 and it would not permit the latch 164, 166 to move downward. The switch 182 keeps the solenoid de-energized while the machine is idle following the automatic disengagement of the clutches.

In considering the operation of the apparatus it may be assumed that both clutches are engaged and that both conveyors are operating. If an article is caught at the slide 68, the said slide is moved forward, thus releasing the latch 150 from the notch 152 and thus causing the lever 146 to effect the disengagement of the clutch for the drying unit conveyor 50 so as to stop the said conveyor. As the lever 146 moves downward it closes the switch 172 thus energizing the solenoid 178 and withdrawing the latch 164, 166 from engagement with the arm 162. As soon as the arm 162 is freed by the latch it moves in the clockwise direction to release the tension in the link 138, thus permitting the member 122 to move downward and cause disengagement of the clutch 22 for the washing unit conveyor 18. Thus movement of the slide 68 not only causes disengagement of the clutch for the drying unit conveyor 50 but also causes disengagement of the clutch 22 for the washing unit conveyor 18. It is particularly important that the washing unit conveyor be stopped simultaneously with the stopping of the drying unit conveyor. If the washing unit conveyor were to continue to operate dishes would be piled at the rear end of the drying unit conveyor and on the slide 62, and this would be seriously objectionable.

Similarly, if the slide 62 is moved, the latch 126 is disengaged from the notch 124 and the lever 44 is moved downward to disengage the clutch 22 for the conveyor 18. Downward movement of the lever 44 closes the switch 140 thus energizing the solenoid 178 and withdrawing the latch 164, 166 from engagement with the arm 162. When the arm 162 is thus freed, the member 154 is free to move downward to cause the disengagement of the clutch for the drying unit conveyor 50. Thus movement of the slide 62 not only causes disengagement of the clutch 22 for the washing unit conveyor but also causes disengagement of the clutch for the drying unit conveyor. It is desirable that the drying unit conveyor be stopped simultaneously with the stopping of the washing unit conveyor, but this is not as important as the stopping of the washing unit conveyor simultaneously with the stopping of the drying unit conveyor. Continued operation of the drying unit conveyor would ordinarily do no harm, and it may therefore sometimes be preferred to omit the switch 140.

By manually closing the stop switch 180 both clutches can be disengaged to stop both conveyors. When the switch 180 is closed, the solenoid 178 is energized to withdraw the latch 164, 166 from engagement with the arm 162. When the arm 162 is free it permits both of the members 154 and 122 to move downward, the levers 146 and 144 moving with them to disengage the corresponding clutches.

After the conveyors have been stopped, whether by the stop switch 180 or as the result of a jam at either slide, the said conveyors can be started simultaneously as aforesaid by pressing the foot treadle 169.

It should be particularly observed that each slide 62 and 68 acts mechanically to disengage its own clutch and to stop its own conveyor. Thus if the solenoid 178 should fail to operate, as for instance because of any interruption in the electrical connections therefor, no serious damage would ensue, as the slide at which a jam occurs mechanically stop its own conveyor. The failure of the other conveyor to stop would be objectionable but would not result in serious damage.

What is claimed is:

1. In a dish washing and drying apparatus, the combination of a washing unit including an endless conveyor for carrying dishes horizontally and including means for directing liquid against dishes on the conveyor to effect washing of said dishes, the said washing unit being provided with a disengageable clutch for operating the conveyor, means for transferring washed dishes from the said conveyor, a drying unit including an endless conveyor located for receiving dishes from the said transfer means and for carrying the said dishes horizontally and including means adjacent the last said conveyor for effecting drying of dishes on said conveyor, the said drying unit being provided with a disengageable clutch for operating the last said conveyor, a slide for transferring dried dishes from the last said conveyor which slide is movable in the direction of dish movement when an article is caught between it and the last said conveyor, and mechanism automatically operable when the said slide is moved as aforesaid and including means connected with said clutches for substantially simultaneously disengaging both of them to stop both conveyors.

2. In a dish washing and drying apparatus, the combination of a washing unit including an endless conveyor for carrying dishes horizontally and including means for directing liquid against dishes on the conveyor to effect washing of said dishes, the said washing unit being provided with a disengageable clutch for operating the conveyor, means for transferring washed dishes from the said conveyor, a drying unit including an endless conveyor located for receiving dishes from the said transfer means and for carrying the said dishes horizontally and including means adjacent the last said conveyor for effecting drying of dishes on said conveyor, the said drying unit being provided with a disengageable clutch for operating the last said conveyor, a slide for transferring dried dishes from the last said conveyor which slide is movable in the direction of dish movement when an article is caught between it and the last said conveyor, mechanism automatically operable when the said slide is moved as aforesaid and including means connected with said clutches for substantially simultaneously disengaging both of them to stop both conveyors, and means for effecting simultaneous engagement of both clutches to start and operate both conveyors which means include a single manually operable device for effecting said clutch engagement.

3. In a dish washing and drying apparatus, the combination of a washing unit including an endless conveyor for carrying dishes horizontally and including means for directing liquid against dishes on the conveyor to effect washing of said dishes, the said washing unit being provided with a disengageable clutch for operating the conveyor, a first slide for transferring washed dishes from the said conveyor which slide is movable in the direction of dish movement when an article is caught between it and the conveyor, a drying unit including an endless conveyor for receiving dishes from the said first transfer slide and for carrying the said dishes horizontally and including means adjacent the last said conveyor for effecting drying of dishes on said conveyor, the said drying unit being provided with a disengageable clutch for operating the last said conveyor, a second slide for transferring dried dishes from the last said conveyor which slide is movable in the direction of dish movement when an article is caught between it and the conveyor, mechanism automatically operable when the said first slide is moved as aforesaid and including means connected with the first said clutch for disengaging it to stop the conveyor of the washing unit, and mechanism automatically operable when the said second slide is moved as aforesaid and including means connected with said clutches for substantially simultaneously disengaging both of them to stop both conveyors.

4. In a dish washing and drying apparatus, the combination of a washing unit including an endless conveyor for carrying dishes horizontally and including means for directing liquid against dishes on the conveyor to effect washing of said dishes, the said washing unit being provided with a disengageable clutch for operating the conveyor, a first slide for transferring washed dishes from the said conveyor which slide is movable in the direction of dish movement when an article is caught between it and the conveyor, a drying unit including an endless conveyor for receiving dishes from the said first transfer slide and for carrying the said dishes horizontally and including means adjacent the last said conveyor for effecting drying of dishes on said conveyor, the said drying unit being provided with a disengageable clutch for operating the last said conveyor, a second slide for transferring dried dishes from the last said conveyor which slide is movable in the direction of dish movement when an article is caught between it and the conveyor, mechanism automatically operable when the first slide is moved as aforesaid and including means connected with the first said clutch for disengaging it to stop the conveyor of the washing unit, mechanism automatically operable when the said second slide is moved as aforesaid and including means connected with said clutches for substantially simultaneously disengaging both of them to stop both conveyors, and means for effecting simultaneous engagement of both clutches to start and operate both conveyors which means include a single manually operable device for effecting said clutch engagement.

5. In a dish washing and drying apparatus, the combination of a washing unit including an endless conveyor for carrying dishes horizontally and including means for directing liquid against dishes on the conveyor to effect washing of said dishes, the said washing unit being provided with a disengageable clutch for operating the conveyor, a first slide for transferring washed dishes from the said conveyor which slide is movable in the direction of dish movement when an article is caught between it and the conveyor, a drying unit including an endless conveyor for receiving dishes from the said first transfer slide and for carrying the said dishes horizontally and including means adjacent the last said conveyor for effecting drying of dishes on said conveyor, the said drying unit being provided with a disengageable clutch for operating the last said conveyor, a second slide for transferring dried dishes from the last said conveyor which slide is movable in the direction of dish movement when an article is caught between it and the conveyor, and clutch operating mechanism including means automatically operable when the first slide is moved as aforesaid which means is connected with said clutches for thereupon substantially simultaneously disengaging both of them and also including means automatically operable when the second slide is moved as aforesaid which means is connected with said clutches for thereupon substantially simultaneously disengaging both of them.

6. In a dish washing and drying apparatus, the combination of a washing unit including an endless conveyor for carrying dishes horizontally and including means for directing liquid against dishes on the conveyor to effect washing of said dishes, the said washing unit being provided with a disengageable clutch for operating the conveyor, means for transferring washed dishes from the said conveyor, a drying unit including an endless conveyor located for receiving dishes from the said transfer means and for carrying the said dishes horizontally and including means adjacent the last said conveyor for effecting drying of dishes on said conveyor, the said drying unit being provided with a disengageable clutch for operating the last said conveyor, a slide for transferring dried dishes from the last said conveyor which slide is movable in the direction of dish movement when an article is caught between it and the last said conveyor, a first mechanism for disengaging the first said clutch to stop the conveyor of the washing unit, a second mechanism automatically operable when the said slide is moved as aforesaid and including means connected with the clutch of the drying unit for disengaging said clutch to stop the conveyor of the drying unit, and automatically acting means dependent upon clutch disengaging operation of the said second mechanism for causing clutch disengaging operation of the said first mechanism.

7. In a dish washing and drying apparatus, the combination of a washing unit including an endless conveyor for carrying dishes horizontally and including means for directing liquid against dishes on the conveyor to effect washing of said dishes, the said washing unit being provided with a disengageable clutch for operating the conveyor, a first slide for transferring washed dishes from the said conveyor which slide is movable in the direction of dish movement when an article is caught between it and the conveyor, a drying unit including an endless conveyor for receiving dishes from the said first transfer slide and for carrying the said dishes horizontally and including means adjacent the last said conveyor for effecting drying of dishes on said conveyor, the said drying unit being provided with a disengageable clutch for operating the last said conveyor, a second slide for transferring dried dishes from the last said conveyor which slide is movable in the direction of dish movement when an article is caught between it and the conveyor, a first mechanism automatically operable when the said first slide is moved as aforesaid for disengaging the first said clutch to stop the conveyor of the washing unit, a second mechanism automatically operable when the said second slide is moved as aforesaid for simultaneously disengaging the second said clutch to stop the conveyor of the drying unit, and automatically acting means dependent upon clutch disengaging operation of the said second mechanism for causing clutch disengaging movement of the said first mechanism independently of the said first slide.

8. In a dish washing and drying apparatus, the combination of a washing unit including an endless conveyor for carrying dishes horizontally and including means for directing liquid against dishes on the conveyor to effect washing of said dishes, the said washing unit being provided with a disengageable clutch for operating the conveyor, a first slide for transferring washed dishes from the said conveyor which slide is movable in the direction of dish movement when an article is caught between it and the conveyor, a drying unit including an endless conveyor for receiving dishes from the said first transfer slide and for carrying the said dishes horizontally and including means adjacent the last said conveyor for effecting drying of dishes on said conveyor, the said drying unit being provided with a disengageable clutch for operating the last said conveyor, a second slide for transferring dried dishes from the last said conveyor which slide is movable in the direction of dish movement when an article is caught between it and the conveyor, a first mechanism automatically operable when the said first slide is moved as aforesaid for disengaging the first said clutch to stop the conveyor of the washing unit, a second mechanism automatically operable when the said second slide is moved as aforesaid for simultaneously disengaging the second said clutch to stop the conveyor of the drying unit, and automatically acting means dependent upon clutch disengaging movement of either the said first mechanism or the said second mechanism for causing clutch disengaging movement of the other mechanism.

9. In a dish washing and drying apparatus, the combination of a washing unit having an endless conveyor for carrying dishes as they are washed, the said unit being provided with a clutch for operating the conveyor, means for transferring dishes from the said conveyor, a drying unit having an endless conveyor for receiving dishes from the said transfer means and for carrying the said dishes as they are dried, the last said unit being provided with a clutch for operating the last said conveyor, a slide for transferring dishes from the last said conveyor which slide is movable in the direction of dish movement when an article is caught between it and the conveyor, and means automatically operable when the said slide is moved as aforesaid for causing the simultaneous disengagement of both clutches to stop both conveyors which means includes an electrically controlled device energized upon the disengagement of the second said clutch for causing the disengagement of the first said clutch.

10. In a dish washing and drying apparatus, the combination of a washing unit having endless conveyor for carrying dishes as they are washed, the said unit being provided with a clutch for operating the conveyor, a first slide for transferring dishes from the said conveyor which slide is movable in the direction of dish movement when an article is caught between it and the conveyor, a drying unit having an endless conveyor for receiving dishes from the said first transfer slide and for carrying the said dishes as they are dried, the last said unit being provided with a clutch for operating the last said conveyor, a second slide for transferring dishes from the last said conveyor which slide is movable in the direction of dish movement when an article is caught between it and the conveyor, a first mechanism automatically operable when the said first slide is moved as aforesaid for disengaging the first said clutch to stop the conveyor of the washing unit, a second mechanism automatically operable when the said second slide is moved as aforesaid for simultaneously disengaging the second said clutch to stop the conveyor of the drying unit, and electrically operated means automatically energized upon clutch disengaging operation of either the said first mechanism or its said second mechanism for causing clutch disengaging operation of the other mechanism.

11. In a dish washing and drying apparatus the combination of a washing unit having an endless conveyor for carrying dishes as they are washed, the said unit being provided with a clutch for operating the conveyor, a first slide for transferring dishes from the said conveyor which slide is movable in the direction of dish movement when an article is caught between it and the conveyor, a drying unit having an endless conveyor for receiving dishes from the said first transfer slide and for carrying the said dishes as they are dried, the last said unit being provided with a clutch for operating the last said conveyor, a second slide for transferring dishes from the last said conveyor which slide is movable in the direction of dish movement when an article is caught between it and the conveyor, means automatically operable when either the said first slide or the said second slide is moved as aforesaid for causing the substantially simultaneous disengagement of both clutches to stop both conveyors which means includes an electrically controlled device energized upon the disengagement of either clutch for causing the disengagement of the other clutch, and circuit connections including a manually operable switch for energizing the electrically controlled device to cause simultaneous disengagement of both clutches to stop both conveyors.

12. In a dish washing and drying apparatus, the combination of a washing unit having an endless conveyor for carrying dishes as they are washed, the said unit being provided with a clutch for operating the conveyor, means for transferring dishes from the said conveyor, a drying unit having an endless conveyor for receiving dishes from the said transfer means and for carrying the said dishes as they are dried, the last said unit being provided with a clutch for operating the last said conveyor, a slide for transferring dishes from the last said conveyor which slide is movable in the direction of dish movement when an article is caught between it and the conveyor, a manually operable clutch controlling mechanism for simultaneously engaging both clutches to start and operate both conveyors, the said mechanism being biased to disengage the clutches, a latch for holding the clutch controlling mechanism in clutch engaging position which latch is automatically movable to its holding position when the manually operable clutch controlling mechanism is operated, a solenoid for disengaging the latch to permit simultaneous disengagement of both clutches by reason of the bias of the clutch controlling mechanism, and circuit connections including a switch automatically closed upon movement as aforesaid of the said slide which switch serves when closed to energize the solenoid.

13. A dish washing and drying apparatus as set forth in claim 12, wherein the circuit connections include a switch in the circuit of the solenoid automatically closed when the latch is in engaged position and automatically opened when the latch is in disengaged position, the said switch serving to deenergize the solenoid upon disengagement of the latch so that the latch is free for automatic reengagement upon manual operation of the clutch controlling mechanism.

14. A dish washing and drying apparatus as set forth in claim 13, wherein the circuit connections include a switch in the circuit of the solenoid automatically closed when the latch is in engaged position and automatically opened when the latch is in disengaged position, the said switch serving to deenergize the solenoid upon disengagement of the latch so that the latch is free for automatic reengagement upon manual operation of the clutch controlling mechanism, and wherein the circuit connections include a third switch adapted to be manually closed which switch serves when closed to energize the solenoid.

15. In a dish washing and drying apparatus, the combination of a washing unit having an endless conveyor for carrying dishes as they are washed, the said unit being provided with a clutch for operating the conveyor, means for transferring dishes from the said conveyor, a drying unit having an endless conveyor for receiving dishes from the said transfer means and for carrying the said dishes as they are dried, the last said unit being provided with a clutch for operating the last said conveyor, a slide for transferring dishes from the last said conveyor which slide is movable in the direction of dish movement when an article is caught between it and the conveyor, a first mechanism for disengaging the first said clutch to stop the conveyor of the washing unit which mechanism is biased for clutch disengaging operation, a latch normally serving to prevent operation of the said first mechanism in accordance with the bias thereof, a solenoid serving when energized to move the said latch to release the said first mechanism, a second mechanism automatically operable when the said slide is moved as aforesaid for disengaging the second said clutch to stop the conveyor of the drying unit, and a normally open switch in circuit with the said solenoid which switch is closed upon the said operation of the said second mechanism to energize the said solenoid for moving the latch and releasing the said first mechanism for clutch disengaging operation.

16. In a dish washing and drying apparatus, the combination of a washing unit including an endless conveyor for carrying dishes horizontally and including means for directing liquid against dishes on the conveyor to effect washing of said dishes, the said washing unit being provided with a disengageable clutch for operating the conveyor, means for transferring washed dishes from the said conveyor, a drying unit including an endless conveyor located for receiving dishes from the said transfer means and for carrying the said dishes horizontally and including means adjacent the last said conveyor for effecting drying of dishes on said conveyor, the said drying unit being provided with a disengageable clutch for operating the last said conveyor, a slide for transferring dried dishes from the last said conveyor which slide is movable in the direction of dish movement when an article is caught between it and the last said conveyor, a first mechanism for disengaging the first said clutch to stop the conveyor of the washing unit, a second mechanism automatically operable when the said slide is moved as aforesaid for disengaging the second said clutch to stop the conveyor of the drying unit, automatically acting means dependent upon clutch disengaging operation of the said second mechanism for causing clutch disengaging operation of the said first mechanism, and manually operable means for simultaneously operating the said first mechanism and the said second mechanism for engaging both clutches to start and operate both conveyors.

17. In a dish washing and drying apparatus, the combination of a washing unit having an endless conveyor for carrying dishes as they are washed, the said unit being provided with a clutch for operating the conveyor, a first slide for transferring dishes from the said conveyor which slide is movable in the direction of dish movement when an article is caught between it and the conveyor, a drying unit having an endless conveyor for receiving dishes from the said first transfer slide and for carrying the said dishes as they are dried, the last said unit being provided with a clutch for operating the last said conveyor, a second slide for transferring dishes from the last said conveyor which slide is movable in the direction of dish movement when an article is caught between it and the conveyor, a first mechanism automatically operable when the said first slide is moved as aforesaid for disengaging the first said clutch to stop the conveyor of the washing unit, a second mechanism automatically operable when the said second slide is moved as aforesaid for simultaneously disengaging the second said clutch to stop the conveyor of the drying unit, and electrically controlled means automatically energized upon clutch disengaging operation of the said second mechanism for causing clutch disengaging operation of the said first mechanism.

18. In a dish washing and drying apparatus, the combination of a washing unit having an endless conveyor for carrying dishes as they are washed, the said unit being provided with a clutch for operating the conveyor, a first slide for transferring dishes from the said conveyor which slide is movable in the direction of dish movement when an article is caught between it and the conveyor, a drying unit having an endless conveyor for receiving dishes from the said first transfer slide and for carrying the said dishes as they are dried, the last said unit being provided with a clutch for operating the last said conveyor, a second slide for transferring dishes from the last said conveyor which slide is movable in the direction of dish movement when an article is caught between it and the conveyor, a first mechanism for disengaging the first said clutch to stop the conveyor of the washing unit which mechanism is biased for clutch disengaging operation, two latches each normally preventing clutch disengaging operation of the said first mechanism and each upon being moved serving independently of the other to release the said first mechanism for clutch disengaging operation, means operable when the said first slide is moved as aforesaid for moving one latch to release the said first mechanism for clutch disengaging operation, a second mechanism automatically operable when the said slide is moved as aforesaid for disengaging the second said clutch to stop the conveyor of the drying unit, and automatically acting means dependent upon the clutch disengaging operation of the said second mechanism for moving the other latch to release the said first mechanism for clutch disengaging operation.

19. A dish washing and drying apparatus as set forth in claim 18, wherein the means for moving the last said latch includes a solenoid and also includes a normally open switch in circuit with the solenoid which switch is closed upon the said operation of the said second mechanism.

20. In a dish washing and drying apparatus, the combination of a washing unit including an endless conveyor for carrying dishes horizontally and including means for directing liquid against dishes on the conveyor to effect washing of said dishes, the said washing unit being provided with a disengageable clutch for operating the conveyor, a first slide for transferring washed dishes from the said conveyor which slide is movable in the direction of dish movement when an article is caught between it and the conveyor, a drying unit including an endless conveyor located for receiving dishes from the said first transfer slide and for carrying the said dishes horizontally and including means adjacent the last said conveyor for effecting drying of dishes on said conveyor, the said drying unit being provided with a disengageable clutch for operating the last said conveyor, a second slide for transferring dried dishes from the last said conveyor which slide is movable in the direction of dish movement when an article is caught between it and the last said conveyor, a first mechanism automatically operable when the said first slide is moved as aforesaid for disengaging the first said clutch to stop the conveyor of the washing unit, a second mechanism automatically operable when the said second slide is moved as aforesaid for simultaneously disengaging the second said clutch to stop the conveyor of the drying unit, automatically acting means dependent upon clutch disengaging operation of the said second mechanism for causing clutch disengaging movement of the said first mechanism independently of the said first slide, and manually operable means for simultaneously operating the said first mechanism and the said second mechanism for engaging both clutches to start and operate both conveyors.

21. In a dish washing and drying apparatus, the combination of a washing unit including an endless conveyor for carrying dishes horizontally and including means for directing liquid against dishes on the conveyor to effect washing of said dishes, the said washing unit being provided with a disengageable clutch for operating the conveyor, a first slide for transferring washed dishes from the said conveyor which slide is movable in the direction of dish movement when an article is caught between it and the conveyor, a drying unit including an endless conveyor for receiving dishes from the said first transfer slide and for carrying the said dishes horizontally and including means adjacent the last said conveyor for effecting drying of dishes on said conveyor, the said drying unit being provided with a disengageable clutch for operating the last said conveyor, a second slide for transferring dried dishes from the last said conveyor which slide is movable in the direction of dish movement when an article is caught between it and the conveyor, clutch operating mechanism including means automatically operable when the first slide is moved as aforesaid which means is connected with said clutches for thereupon substantially simultaneously disengaging both of them and also including means automatically operable when the second slide is moved as aforesaid which means is connected with said clutches for thereupon substantially simultaneously disengaging both of them, and means for effecting simultaneous engagement of both clutches to start and operate both conveyors which means includes a single manually operable device for effecting said clutch engagement.

22. In a dish washing and drying apparatus, the combination of a washing unit having an endless conveyor for carrying dishes as they are washed, and said unit being provided with a clutch for operating the conveyor, a first slide for transferring dishes from the said conveyor which slide is movable in the direction of dish movement when an article is caught between it and the conveyor, a drying unit having an endless conveyor for receiving dishes from the said first transfer slide and for carrying the said dishes as they are dried, the last said unit being provided with a clutch for operating the last said conveyor, a slide for transferring dishes from the last said conveyor which slide is movable in the direction of dish movement when an article is caught between it and the conveyor, a manually operable clutch controlling mechanism for simultaneously engaging both clutches to start and operate both conveyors, the said mechanism being biased to disengage the clutches, a latch for holding the clutch controlling mechanism in clutch engaging position which latch is automatically movable to its holding position when the manually operable clutch controlling mechanism is operated, a solenoid for disengaging the latch to permit simultaneous disengagement of both clutches by reason of the bias of the clutch controlling mechanism, and circuit connecions including two switches each serving when closed to energize the solenoid, one switch being automatically closed upon movement as aforesaid of the said first slide and the other switch being automatically closed upon movement as aforesaid of the said second slide.

23. In a dish washing and drying apparatus, the combination of a washing unit having an endless conveyor for carrying dishes as they are washed, the said unit being provided with a clutch for operating the conveyor, a first slide for transferring dishes from the said conveyor which slide is movable in the direction of dish movement when an article is caught between it and the conveyor, a drying unit having an endless conveyor for receiving dishes from the said first transfer slide and for carrying the said dishes as they are dried, the last said unit being provided with a clutch for operating the last said conveyor, a second slide for transferring dishes from the last said conveyor which slide is movable in the direction of dish movement when an article is caught between it and the conveyor, a first mechanism for disengaging the first said clutch to stop the conveyor of the washing unit which mechanism is biased for clutch disengaging operation, a first latch normally preventing clutch disengaging operation of the said first mechanism and upon being moved serving to release the said mechanism for such operation, means operable when the first said slide is moved as aforesaid for moving the said first latch to release the said first mechanism for clutch disengaging operation, a second mechanism for disengaging the second said clutch to stop the conveyor of the drying unit which mechanism is biased for clutch disengaging operation, a second latch normally preventing clutch disengaging operation of the said second mechanism and upon being moved serving to release the said mechanism for such operation, means operable when the second said slide is moved as aforesaid for moving the said second latch to release the said second mechanism for clutch disengaging operation, a third latch normally serving in cooperation with the said first and second latches to prevent clutch disengaging operations of each of said first and second mechanisms which third latch upon being moved serves to release either of the said mechanisms for clutch disengaging operation, and means automatically operable upon the clutch disengaging operation of either of the said first and second mechanisms by the movement of the corresponding first or second latch and thereupon serving to move the said third latch to release the remaining mechanism for clutch disengaging operation.

24. A dish washing and drying apparatus as set forth in claim 23, wherein means for moving the third latch is a solenoid, and wherein two normally open switches are connected in series with the solenoid and in parallel with each other, the said switches being closed respectively by the said first and second mechanisms upon clutch disengaging operation thereof and each of them upon being closed energizing the solenoid to move the said third latch.

References Cited in the file of this patent

UNITED STATES PATENTS

| | | |
|---|---|---|
| 1,354,049 | Linton | Sept. 28, 1920 |
| 1,583,034 | Valerius et al. | May 4, 1926 |
| 1,697,879 | Olson | Jan. 8, 1929 |
| 1,719,409 | Webb | July 2, 1929 |
| 1,719,410 | Webb | July 2, 1929 |
| 1,728,283 | Fisher | Sept. 17, 1929 |
| 1,765,996 | Olson | June 24, 1930 |
| 1,775,003 | Soelch | Sept. 2, 1930 |
| 1,936,279 | Webb | Nov. 21, 1933 |
| 1,940,647 | Gruetter | Dec. 19, 1933 |
| 2,372,130 | Smith | Mar. 20, 1945 |
| 2,541,515 | Hoffmann et al. | Feb. 13, 1951 |

FOREIGN PATENTS

| | | |
|---|---|---|
| 322,453 | France | June 24, 1902 |
| 520,699 | Germany | Mar. 13, 1931 |